United States Patent [19]
Förster et al.

[11] 3,885,456
[45] May 27, 1975

[54] SERVO-STEERING DEVICE FOR VEHICLES

[75] Inventors: Hans-Joachim M. Förster, Stuttgart-Riedenberg; Manfred Bülow, Stuttgart, both of Germany

[73] Assignee: Daimler-Benz Aktiengesellschaft, Germany

[22] Filed: Nov. 21, 1973

[21] Appl. No.: 418,053

Related U.S. Application Data

[63] Continuation of Ser. No. 269,876, Aug. 7, 1972, abandoned, which is a continuation of Ser. No. 62,039, Aug. 7, 1970, abandoned.

[30] Foreign Application Priority Data

Aug. 8, 1969  Germany............................ 1940490

[52] U.S. Cl. .................. 91/380; 91/466; 92/136
[51] Int. Cl. ........................... F15b 9/10; F15b 13/04
[58] Field of Search ............ 91/380, 368, 466, 422, 91/469; 92/136, 138; 180/79.2 R

[56] References Cited
UNITED STATES PATENTS

| | | | |
|---|---|---|---|
| 2,954,837 | 10/1960 | Ziskal ............................. | 91/380 |
| 3,010,335 | 11/1961 | Foerster et al. ..................... | 91/380 |
| 3,242,824 | 3/1966 | Jablonsky et al. ..................... | 91/380 |
| 3,489,065 | 1/1970 | Forster et al. ...................... | 91/466 |
| 3,602,101 | 8/1971 | Jablonsky ......................... | 91/422 |
| 3,687,014 | 8/1972 | Forster et al. ...................... | 91/380 |

*Primary Examiner*—Paul E. Maslowsky
*Attorney, Agent, or Firm*—Craig & Antonelli

[57] ABSTRACT

A servo-steering for motor vehicles in which a steering nut is rotatably and axially non-displaceably supported in the working piston and is helically movably connected with a steering worm axially non-displaceably secured with respect to the gear housing; the axis of the steering shaft in meshing engagement with the working piston by appropriate toothed arrangements as well as the axis of the control slide valve member are disposed in the center stroke position of the working piston in a common diametric plane of the gear housing; the axis of the control slide valve member extends perpendicularly to the axis of the steering shaft and the steering shaft is provided with a single toothed segment whose tooth width at the root is disposed approximately centric to that axial plane of the gear housing which is perpendicular to the axis of the steering shaft and contains the longitudinal axis of the working cylinder; the working piston, within the area of its toothed rack profile, is provided with a radial aperture for the insertion of the steering nut, and the center axis of this aperture extends perpendicularly to the longitudinal axis of the working piston.

72 Claims, 6 Drawing Figures

SERVO-STEERING DEVICE FOR VEHICLES

This application is a continuation application of Ser. No. 269,876, filed July 7, 1972 now abandoned, which is a continuation application of Ser. No. 62,039, filed Aug. 7, 1970 now abandoned.

The present invention relates to a servo-steering device for vehicles, in which a steering nut rotatably and axially non-displaceably supported in the working piston is helically movably connected with a steering worm secured axially non-displaceably with respect to the gear housing, and in which the axis of the steering shaft in meshing toothed engagement with the working piston as well as the axis of the control slide valve are disposed in the center stroke position of the working piston, together with the center plane of the steering nut perpendicular to its axis of rotation, approximately in a common diametric plane of the steering gear housing.

With the servo-steering of this type described in the German Pat. No. 1,138,652, the control slide valve and steering shaft are arranged parallel to one another on different sides of the steering gear housing so that the gear housing is constructed relatively wide. The steering shaft of this prior art servo steering device is provided with two toothed segments arranged one behind the other in the longitudinal direction of the shaft, which engage into two toothed rack profiles at the working piston. This double arrangement of toothed segment and rack requires a large diameter at the working piston. Since the steering nut with this double arrangement projects into the space between the two toothed segments, a separate housing bulge is necessary for the insertion and installation of the steering shaft into the gear housing. The large piston diameter as well as the separate housing bulge enlarge the gear housing and increase the cost thereof. The requirement for a large piston diameter, which has to be fulfilled in the prior art steering device both for the accommodation of the two toothed rack profiles as also for the axial insertion of the steering nut into the working piston, is also opposed to the frequently advantageous measure to insert the control slide valve directly into a housing bore of the gear housing. The large piston diameter in the prior art steering system would in case of application of this measure, render difficult also the accommodation of a pivotally supported valve lever acting between the control slide valve and the steering nut.

The purpose and aim on which the present invention is predicated, essentially consists in eliminating the aforementioned disadvantages and in providing a servo steering that has a short, relatively narrow and compact gear housing.

The underlying problems are solved according to the present invention by a further development of the steering device of the aforementioned prior art type in that the axis of the control slide valve extends perpendicularly to the axis of the steering shaft and the steering shaft is provided with a single toothed segment, whose tooth width is arranged approximately centric to the axial plane of the gear housing disposed perpendicularly to the axis of the steering shaft and containing the longitudinal axis of the working cylinder, and in that the working piston is provided at the height of its toothed rack profile with a radial recess or aperture for the insertion of the steering nut and the center axis of this aperture extends perpendicularly to the longitudinal axis of the working piston.

A servo steering is realized by the present invention whose steering gear housing is practically not longer than is necessary for the accommodation of the toothed segment and of the working piston. All of the parts important for the steering are accommodated within the narrowest or smallest space.

The arrangement of the control slide valve according to the present invention entails the advantage that the gear housing is not constructed longer and wider than is necessary for the sole accommodation of the steering shaft. The gear housing of the servo steering according to the present invention, as a result of its short structural length, may be arranged for safety reasons directly at the end wall of the vehicle, without causing the steering coupling to project into the passenger space. The piston diameter can be kept small or stepped by the radial insertion of the steering nut into the working piston so that the gear housing is constructed relatively narrow. This is of particular advantage since the wheel casings, the frame as well as the engine interfere in the vehicle within the area of the steering gear.

If the arrangement is made in such a manner that the center axis of the aperture for the insertion of the steering nut extends parallel to the plane of the root of the tooth of the toothed rack profile, then a uniform wall thickness between the aperture and the toothed rack profile results, advantageous for manufacturing reasons, whereby aperture and toothed profile can be manufactured in a simple manner.

Accordingly, it is an object of the present invention to provide a servo-steering for vehicles which avoids by simple means the aforementioned shortcomings and drawbacks encountered in the prior art.

Another object of the present invention resides in a servo-steering for vehicles which results in a short and relatively narrow as well as compact steering gear housing.

A further object of the present invention resides in a steering gear for servo-steering mechanisms in which all parts important for the control can be accommodated within the smallest space and the steering gear housing is practically not longer than necessary for accommodating the toothed segment and working piston.

Still a further object of the present invention resides in a steering gear for servo-steering mechanisms of vehicles which entails the advantage of relatively short structural length and small diametric dimensions as well as facilitated manufacture of the various parts thereof.

These and further objects, features and advantages of the present invention will become more obvious from the following description when taken in connection with the accompanying drawing which shows, for purposes of illustration only, several embodiments in accordance with the present invention, and wherein.

Figure 2:
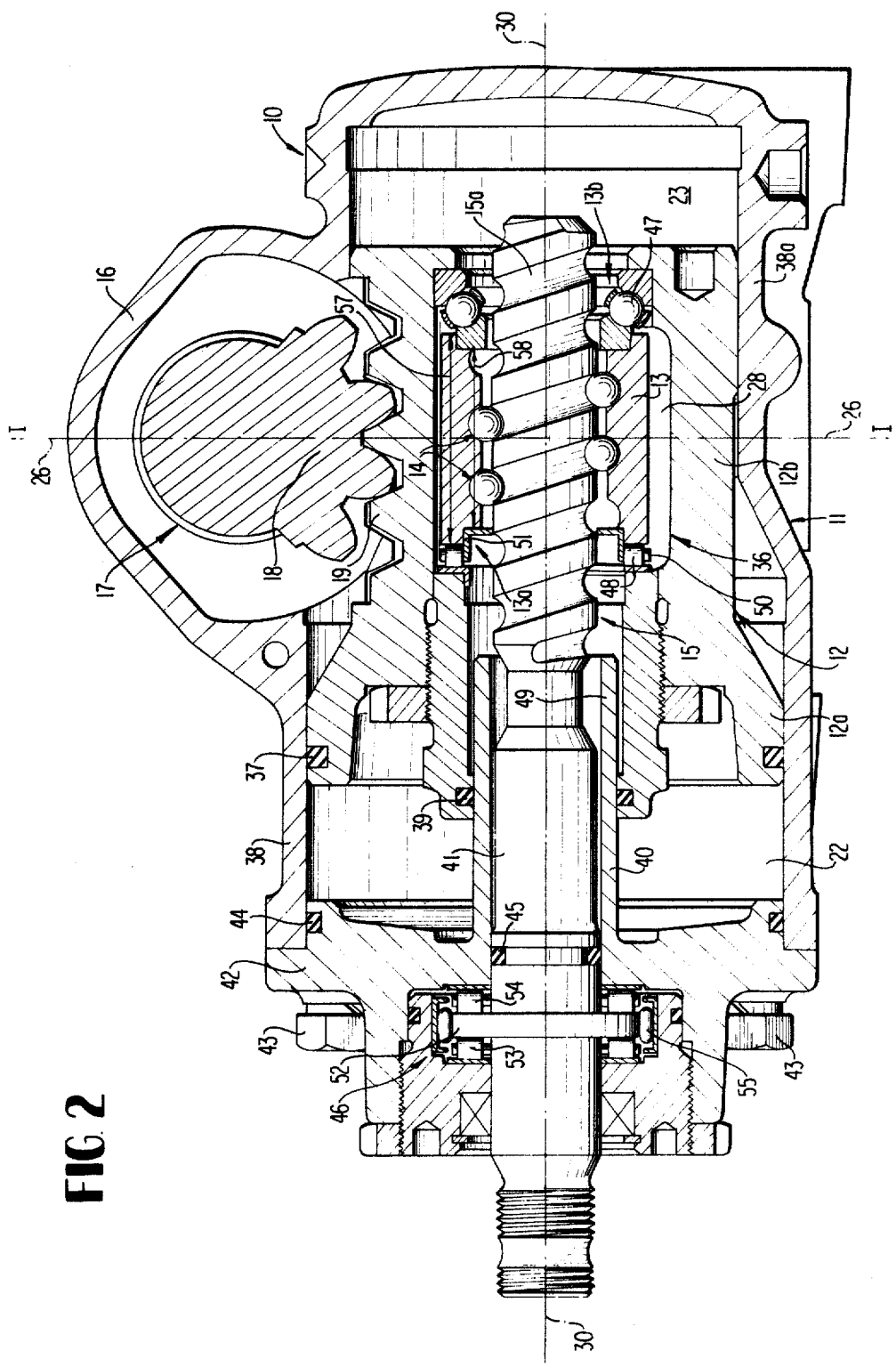
FIG. 2 is a longitudinal cross-sectional view through the steering mechanism of the first embodiment taken along line II—II of FIG. 1.
Figure 5:
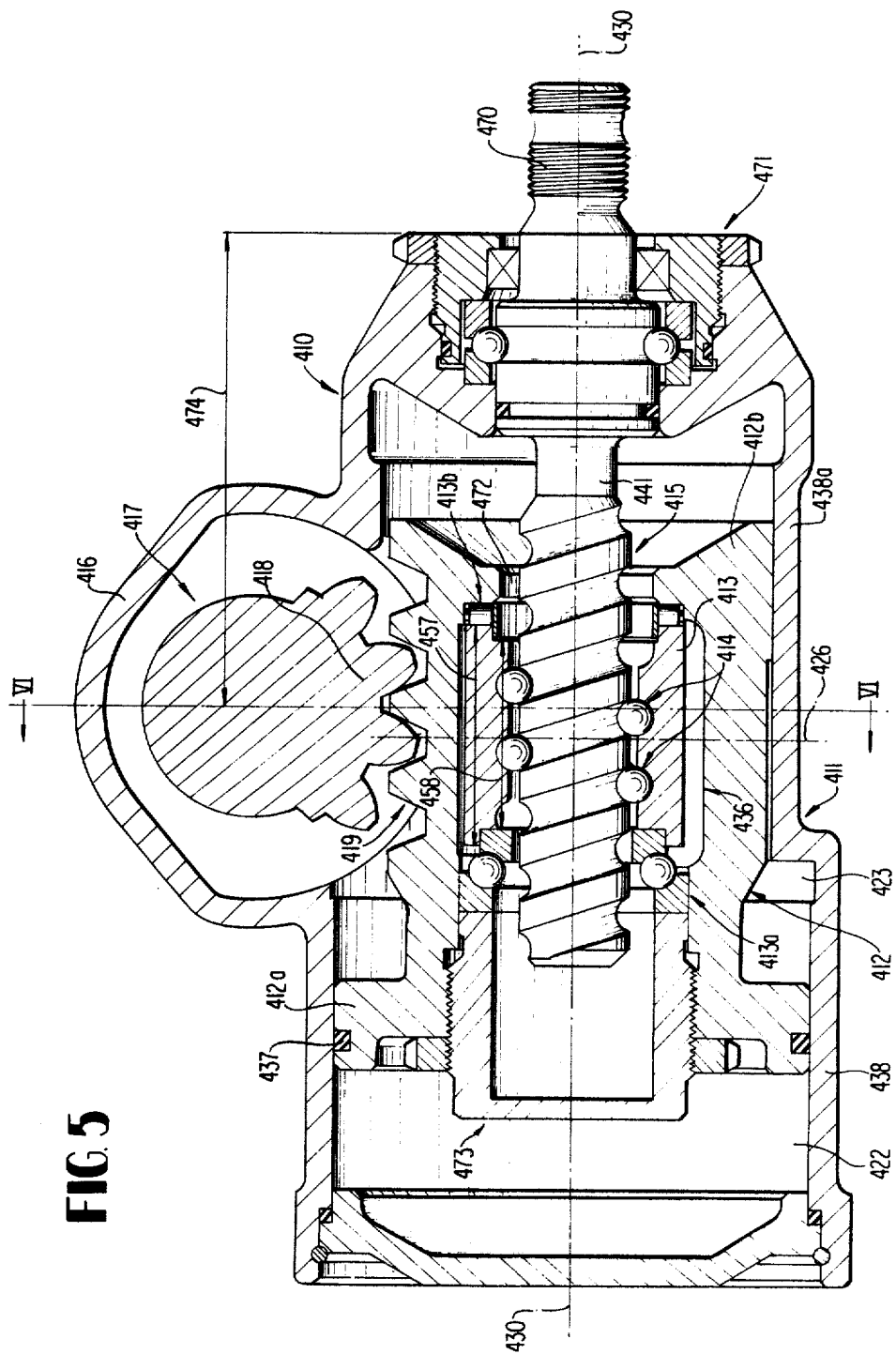
Figure 6:
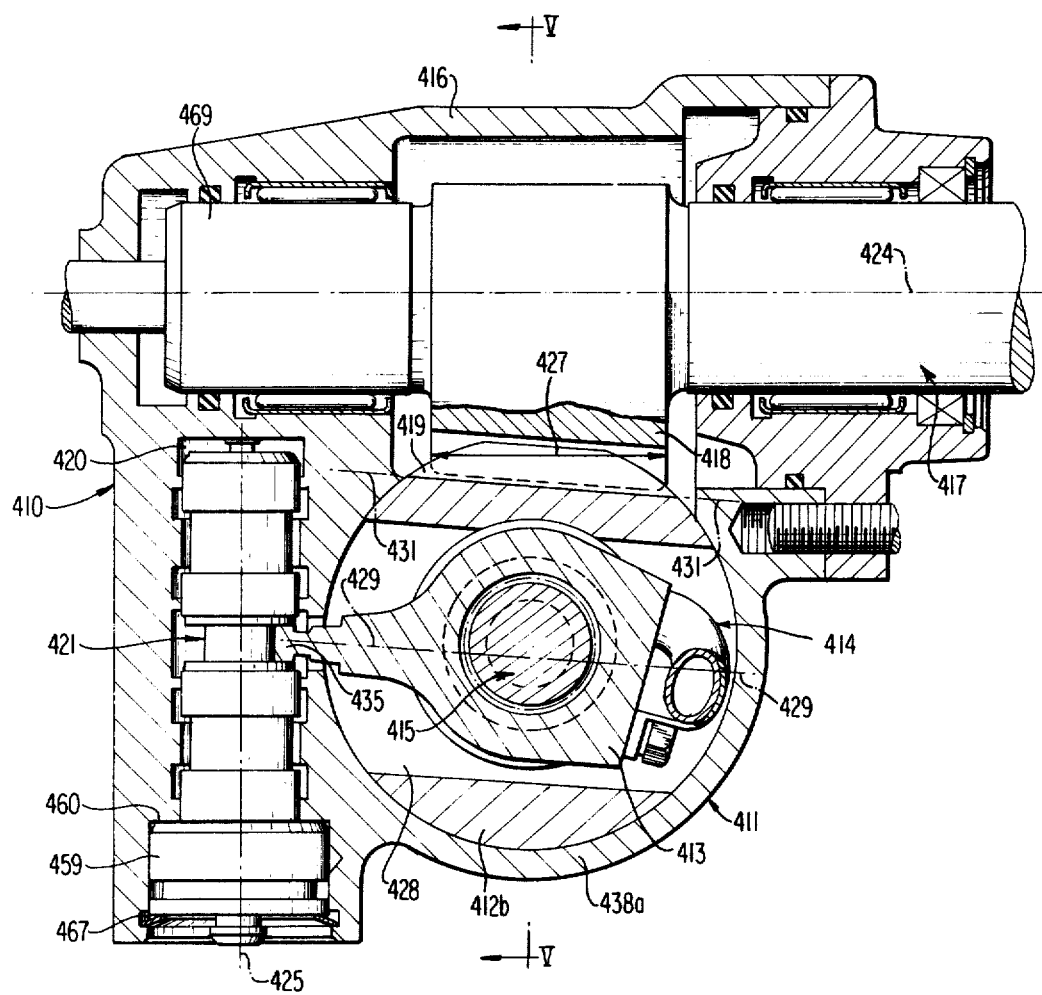

FIG. 5 is a longitudinal cross-sectional view, similar to FIG. 2, through the steering mechanism of a fourth embodiment taken along line V—V of FIG. 6; and FIG. 6 is a cross-sectional view in the diametric plane containing the axes of the control slide valve and steering shaft of the fourth embodiment of a steering mechanism in accordance with the present invention and taken along line VI—VI of FIG. 5.

Figure 1:
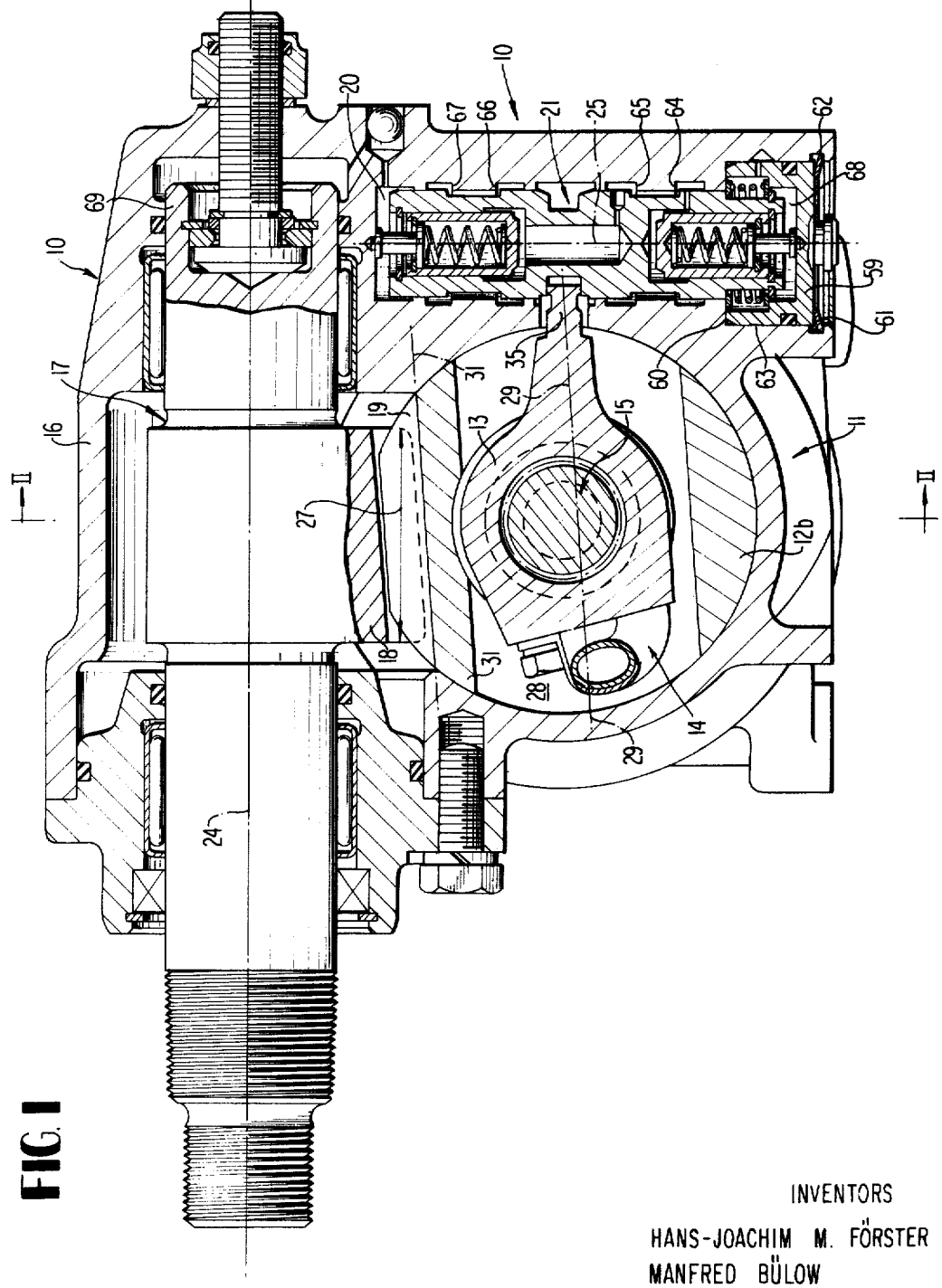
FIG. 1 is a cross-sectional view in the diametric plane containing the axis of the control slide valve and of the steering shaft of a first embodiment of a steering gear in accordance with the present invention, taken along line I—I of FIG. 2.
Figure 4:
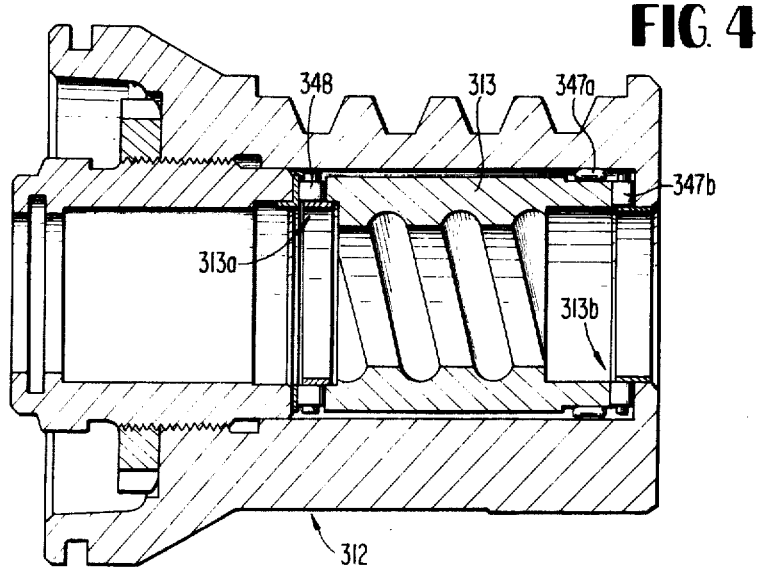
FIG. 4 is a longitudinal cross-sectional view through the working piston with the steering nut as individual parts of a third embodiment of a steering mechanism in accordance with the present invention.

The steering device of FIGS. 1 and 2 differs from the steering device of FIG. 4 exclusively in that the inclined ball bearing 47 between the steering nut and working piston in FIG. 2 is replaced by the bearing combination consisting of a radial and an axial roller bearing 347a, 347b of FIG. 4.

Figure 3:
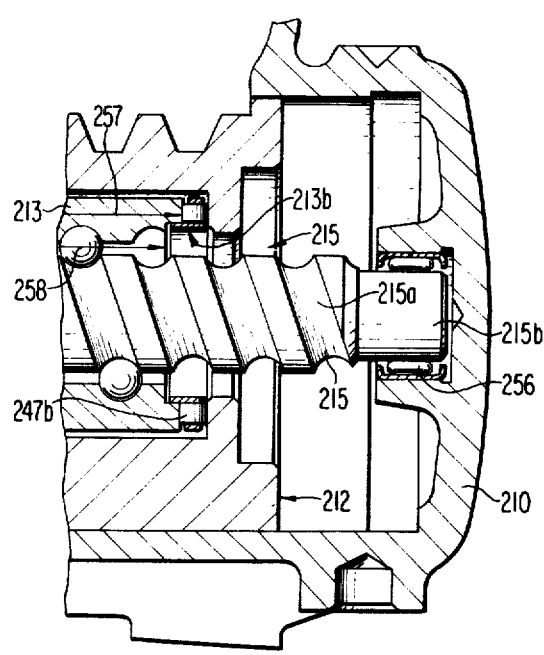
FIG. 3 is a partial longitudinal cross-sectional view, correspondin to line II—II of FIG. 1, through a second embodiment of a steering mechainsm in accordance with the present invention.

The difference between the steering mechanisms of FIGS. 1 and 2, on the one hand, and of FIG. 3, on the other, essentially consists in that the inner end of the steering worm (FIG. 3) is supported in the gear housing by a radial roller bearing 256 and the steering nut is radially movably supported in the working piston at both bearing places.

In the fourth embodiment (FIGS. 5 and 6) of the present invention, the steering spindle outer extension is displaced to the side of the gear housing opposite to that of the first embodiment according to FIGS. 1 and 2 whereby the distance between steering spindle external extension-steering shaft center is very small and the gear housing is constructed over-all very short.

The first three embodiments of FIGS. 1 through 4 are similar, i.e., correspond to one another in the following features to be described hereinafter.

Referring now to the drawing wherein like reference numerals are used throughout the various views to designate like parts, and more particularly to FIGS. 1 and 2, the steering gear housing generally designated by reference numeral 10 of the steering mechanisms according to the present invention is provided, as can be seen from these figures, with a working cylinder generally designated by reference numeral 11, which is stepped or offset in diameter (FIG. 2). A working piston generally disignated by reference numeral 12 (FIG. 2) is axially displaceably guided in the narrow cylinder portion 38a of the working cylinder 11. The working piston 12 is provided, corresponding to the cylinder offset, with a piston portion 12a enlarged in the diameter thereof for its effective working surface sealed off with respect to the wide cylinder portion 38 as well as with a reduced guide piston portion 12b reduced in diameter. The housing 10 is constructed very narrow as a result of the reduction in diameter of the guide piston portion 12b. A steering nut 13 is rotatably and axially non-displaceably supported at the bearing places generally designated by reference numerals 13a and 13b within the guide piston portion 12b of the working piston 12; the steering nut 13 is helically or spirally movably connected with a steering worm generally designated by reference numeral 15 by way of a conventional ball circulation generally designated by reference numeral 14. The steering shaft generally designated by reference numeral 17 is supported within a bulge 16 of the gear housing 10. The steering shaft 17 is provided with a rigid toothed segment 18 that is in meshing engagement with a toothed rack profile 19 in the narrower guide piston portion 12b of the working piston 12. The gear housing 10 is further provided with a housing bore 20 (FIG. 1), into which is directly inserted the control slide valve generally designated by reference numeral 21, by means of which the feed and discharge of the pressure medium into the working spaces 22 and 23 of the working cylinder 11 on both sides of the working piston 12 is controlled in a conventional manner.

The axis 24 of the steering shaft 17 and the axis 25 of the control slide valve 21 are disposed in the common diametric plane I—I of the gear housing 10. In the central stroke position of the working piston 12, illustrated in FIG. 2, the center plane 26, normal to the axis of rotation, of the steering nut 13 and the diametric plane I—I coincide.

The steering device of FIGS. 5 and 6, representing the fourth embodiment, essentially corresponds in its basic arrangement to the first three embodiments described above. The gear housing generally designated by reference numeral 410 is provided with a working cylinder generally designated by reference numeral 411 which is stepped or offset in diameter. A correspondingly stepped or offset working piston generally designated by reference numeral 412 is displaceably guided within the working cylinder 411. The working piston 412 (FIG. 5) is sealed with respect to the wide cylinder portion 438 by its wide piston portion 412a by means of a seal 437 and is radially guided in the relatively narrow cylinder portion 438a by way of its narrow guide piston portion 412b. A steering nut 413 which is rotatably and axially non-displaceably supported in the guide piston portion 412b at the bearing places generally designated by reference numerals 413a and 413b, is spirally or helically movably connected with a steering worm 415 by way of a conventional ball circulation generally designated by reference numeral 414. A steering shaft generally designated by reference numeral 417 is supported in a bulge 416 of the gear housing 410; the steering shaft 417 is provided with a rigid toothed segment 418 that is in meshing engagement with a toothed rack profile 419 in the narrow guide piston portion 412b. The gear housing 410 is further provided with a housing bore 420 (FIG. 6) into which is directly inserted the control slide valve generally designated by reference numeral 421 by means of which is controlled in a conventional manner the supply and discharge of the pressure medium into and from the working spaces 422 and 423 (FIG. 5) of the working cylinder 411 on both sides of the working piston 412.

The axis 424 of the steering shaft 417 (FIG. 6) and the axis 425 of the control slide valve 421 are disposed in a common diametric plane VI—VI of the gear housing 410. In the center stroke position of the working piston 412, illustrated in FIG. 5, the center plane 426, perpendicular to the axis of rotation, of the steering nut 413 and the diameter plane VI—VI have only a small distance from one another so that the construction of the gear housing is short.

According to the present invention, the following basic arrangement is provided in the four embodiments of the steering mechanisms:

The axis 24 or 424 of the steering shaft 17 or 417 and the axis 25 or 425 of the control slide valve 21 or 421 are disposed perpendicular to one another. The tooth width 27 (FIG. 1) or 427 (FIG. 6) of the single toothed segment 18 or 418 of the steering shaft 17 or 417 is arranged approximately centric to the axial plane II—II or V—V of the gear housing 10 or 410. The working piston 12 or 412 is provided with a radial aperture 28 (FIG. 1) or 428 (FIG. 6) for the insertion of the steering nut 13 or 413. The center axis 29 or 429 of this aperture 28 or 428 extends both perpendicular to the longitudinal axis 30 or 430 of the working piston 12 or 412 as also parallel to the plane 31 or 431 of the root of the tooth of the single toothed rack profile 19 or 419 at the working piston 12 or 412.

The aperture 28 or 428 is disposed in the direction of the piston longitudinal axis 30 or 430 at the height of the toothed rack profile 19 or 419 within the guide piston portion 12b or 412b. It is possible by the provision of the aperture 28 or 428 to construct the control bar 35 (FIG. 1) or 435 (FIG. 6) for the actuation of the control slide valve member 21 or 421 in one piece with the steering nut 13 or 413, and to insert the steering nut 13 or 413 radially into the working piston 12 or 412 through aperture 28 or 428. As a result of the arrangement of the control slide valve 21 or 421 perpendicular to the steering shaft 17 or 417, the gear housing 10 or 410 does not become longer and wider than is necessary for the support of the steering shaft. The working cylinder 11 or 411 is located close to the common point of intersection of the axes 24 and 25 or 424 and 425 so that the housing cross section is small. The steering according to the present invention is provided only with a single toothed segment 18 or 418 whose corresponding toothed rack profile 19 or 419 is provided at the narrow guide piston portion 12b or 412b of the working piston. A reduction of the piston diameter compared to the known steering mechanisms results therefrom.

For purposes of simplification of the manufacture of the working piston, the radial aperture 28 or 428 extends completely through the piston. A rectangular cross section is provided for the aperture as is indicated by reference numeral 36 in FIG. 2 and by reference numeral 436 in FIG. 5 so that the piston can be broached.

In the first three embodiments illustrated in FIGS. 1 through 4, the working piston 12 is sealed radially outwardly with respect to the relatively wide cylinder wall 38, i.e., relatively wide in diameter, of the working cylinder 11 by a seal packing 37 and radially inwardly with respect to a sealing sleeve 40 by a sealing packing 39. The sealing sleeve 40 surrounds concentrically the rigid coaxial spindle portion 41 of the steering worm 15. The sealing sleeve 40 is constructed in one piece with a housing end cover 42 in which the spindle portion 41 is axially and radially substantially non-displaceably supported by means of a bearing arrangement generally designated by reference numeral 46. The housing end cover 42 is secured at the gear housing 10 by means of bolts 43 and is sealed with respect to the working cylinder 11 by an O-ring 44 as well as with respect to the spindle part 41 by a further O-ring 45.

In the embodiment of FIGS. 1 and 2, the steering worm 15 is radially supported in the working piston 12 at its end 15a opposite the bearing arrangement 46 by way of the ball circulation 14, the steering nut 13 and an inclined ball bearing 47.

The steering nut 13 possesses at its other bearing place 13a a certain radial freedom of movement with respect to the working piston 12 so that the two-point support 46, 47 of the steering worm 15 is not disturbed or impaired by the bearing place 13a, at which only an axial roller bearing 48 is provided between the steering nut 13 and the working piston 12. As a result thereof, also radial constructional space is gained so that the bearing 48, during the stroke movements of the working piston 12 within the area of one end position, is able to travel over the inner end 49 of the sealing sleeve 40. As a result thereof, the steering mechanism is of axially shorter construction. A compact bearing arrangement is achieved in that the cage 50 of the axial roller bearing 48 is centered at the steering nut 13 by radially inwardly disposed engaging parts 51 which project axially out of one bearing side.

In the bearing arrangement 46 at the spindle part 41 of the steering worm 15, a radial collar 52 of the spindle part 41 is axially supported on both sides by one axial roller bearing 53 and 54, each. A reduction of the structural length of the spindle bearing is realized in that the radial bearing 55 of the spindle part 41 is arranged directly between the collar 52 and the housing 10 or housing end cover 42.

In the third embodiment of the servo-steering according to the present invention, illustrated in FIG. 4, the bearing of the steering nut 313 in the working piston 312 at the bearing place 313a (axial roller bearing 348) corresponds to the bearing construction at the bearing place 13a of the first embodiment (FIG. 2). The second bearing place 313b is characterized in that the steering nut 313 is supported thereat in the working piston 312 both by a radial roller bearing 347a as also by an axial roller bearing 347b. Both radial as also axial constructional space is gained thereby so that this bearing enables above all a shorter construction.

In the second embodiment of the servo-steering according to the present invention illustrated in FIG. 3, the bearing place (not shown) facing the steering spindle part of the steering nut 213 corresponds to the bearing place 13a in FIG. 2, i.e., the steering nut 213 is supported in the working piston 212 at the non-illustrated bearing place exclusively by an axial roller bearing which gives to the steering nut 213 a certain radial freedom of movement. Also at the other bearing place 213b the steering nut 213 is supported in the working piston 212 exclusively by an axial roller bearing 247b and has thereat also a certain radial freedom of movement. The housing-inner end 215a of the steering worm 215 is supported in this embodiment in the gear housing 210 by means of a pin 215b and a radial roller bearing 256. With this construction, radial movements of the working piston 212 are not transmitted to the steering worm.

The steering nuts 13 and 213 are characterized by a particularly short structural length 57 (FIG. 2) and 257 (FIG. 3), respectively, which is not substantially longer than the associated screw length 58 and 258 of the steering nut.

As can be further seen from FIG. 1, the housing bore 20 for the control slide valve member 21 is closed off toward the outside by a cover 59 recessed into the gear housing 10. The cover 59 is supported in the inward direction without play at a housing shoulder 60 against which it is pressed by the effect of an elastic retaining ring 61. The retaining ring 61 is inserted into an annular groove 62 in the housing bore 63 for the cover 59. The housing shoulder 60 forms in conjunction with the clearance-free support of the control slide valve member 21, a reference edge for the thus-facilitated manufacture of the housing control edges 64 to 67. The cover 59 is constructed pot-shaped, and the control slide valve member 21 projects into the interior space 68 of the pot. The control valve assembly is of short construction by the overlap achieved thereby between control slide valve and cover in the direction of the control slide valve axis 25.

As a result of the arrangement of the control slide valve 21 at the housing-inner end 69 of the steering shaft 17, the control slide valve 21 is disposed above the working cylinder 11 in the installed position so that an effective operating venting of the working spaces 22 and 23 is assured by way of the control slide valve.

In the fourth embodiment of FIGS. 5 and 6, the steering spindle part 441 (FIG. 5) rigidly connected with the steering worm 415 extends out of the gear housing 410 at that housing end face generally designated by reference numeral 471 which is adjacent the narrow guide piston portion 412b of the working piston 412. As a result thereof, the distance 474 (FIG. 5) between the steering shaft axis 424 (FIG. 6) and the housing end face 471 can be kept small so that the steering device is of short construction. The concentric opening 472 of the working piston 412 is closed in a pressure-tight manner at the wide end of the working piston by a threaded closure cover 473 so that a separate sealing bush between working piston 412 and steering spindle part 441 is not necessary. Reference numeral 470 designates the rigid coaxial coupling pin of the steering spindle part 441, by means of which the steering worm 415 can be connected with the steering wheel.

The fourth embodiment of the steering device according to the persent invention illustrated in FIGS. 5 and 6 corresponds in the remaining features to those of the first embodiment illustrated in FIGS. 1 and 2.

While we have shown and described several embodiments in accordance with the present invention, it is understood that the same is not limited thereto but is susceptible of numerous changes and modifications as known to those skilled in the art. For example, one or several features of one embodiment described herein may be used also with another one of the illustrated embodiments. Consequently, we do not wish to be limited to the details shown and described herein but intend to cover all such changes and modifications as are encompassed by the scope of the appended claims.

We claim:

1. A servo-steering arrangement for vehicles comprising: housing means, a working piston displaceably supported within a working cylinder formed in said housing means, a steering shaft having toothed segment means in meshing engagement with toothed rack profile means provided on said working piston, a steering nut rotatably supported in said working piston in a position axially fixed with respect to said working piston, a steering worm axially non-displaceably supported within said housing means, said steering nut being helically movably connected with said steering worm, and control slide valve means for controlling fluid flow to working spaces adjacent the working piston, the axes of the steering shaft and the control slide valve means being substantially perpendicular to one another, the axis of the steering shaft being disposed in a diametric plane extending substantially perpendicular to the axis of rotation of the steering nut, the toothed segment means of said steering shaft having a tooth width disposed approximately centric to an axial plane of the housing means, said axial plane extending substantially perpendicularly to the axis of the steering shaft, the longitudinal axis of the working piston being disposed in said axial plane, the working piston being provided with substantially radial aperture means within the area of its toothed rack profile means for the insertion of the steering nut, the center axis of the aperture means being substantially perpendicular to the longitudinal axis of the working piston.

2. A servo-steering arrangement according of claim 1, characterized in that the steering shaft is provided with a single toothed segment means.

3. A servo-steering arrangement according to claim 1, characterized in that the center axis of the aperture means extends substantially parallel to the plane of the root of the teeth of the toothed rack profile means.

4. A servo-steering arrangement according to claim 1, characterized in that the working piston is stepped in diameter and the radial aperture means is arranged in the relatively narrow piston portion.

5. A servo-steering arrangement according to claim 4, characterized in that the aperture means for the insertion of the steering nut extends completely through the working piston.

6. A servo-steering arrangement according to claim 5, characterized in that the aperture means has a substantially constant and essentially rectangular cross section.

7. A servo-steering arrangement according to claim 6, characterized in that the steering nut is provided with a control bar disposed substantially perpendicular to its axis of rotation for the actuation of the control slide valve means which control bar is formed in one piece with the steering nut.

8. A servo-steering arrangement according to claim 7, characterized in that the control slide valve means is inserted directly into a housing bore of the housing means.

9. A servo-steering arrangement according to claim 8, characterized in that the steering nut is supported at one end with respect to the working piston exclusively by an axial bearing.

10. A servo-steering arrangement according to claim 9, characterized in that said last-mentioned axial bearing is a roller bearing.

11. A servo-steering arrangement according to claim 9, characterized in that a member which supports said axial bearing of the steering nut is operable to travel over an inner end of a sealing bush means forming a radial inner seal of the working piston, said sealing bush means being fixedly inserted into the gear housing and surrounding a steering spindle rigidly connected to the steering worm.

12. A servo-steering arrangement according to claim 11, characterized in that said last-mentioned axial bearing is a roller bearing.

13. A servo-steering arrangement according to claim 12, characterized in that a cage at the bearing place associated with the axial bearing nut is provided, said cage having a radial inner part with axial engaging means for centering the cage at the steering nut.

14. A servo-steering arrangement according to claim 13, characterized in that the steering spindle is provided with a collar which is supported axially and radially with respect to the housing means by means of respective axial and radial roller bearings, and in that the associated radial roller bearing is arranged at the circumference of the collar.

15. A servo-steering arrangement according to claim 14, characterized in that the steering nut is supported at one bearing place exclusively by an axial bearing, and at another spaced bearing place the steering nut is supported both radially and axially non-displaceably with respect to the working piston.

16. A servo-steering arrangement according to claim 14, characterized in that the steering nut is supported axially non-displaceably in the working piston but is supported radially displaceably at two spaced bearing places, and in that the steering worm is supported at both ends radially non-displaceably in the housing.

17. A servo-steering arrangement according to claim 14, characterized in that the steering nut is non-displaceably supported in the working piston at one of its bearing places by both a radial and an axial roller bearing.

18. A servo-steering arrangement according to claim 1, characterized in that a housing bore provided in the housing for the control slide valve means is closed off in the outward direction by a recessed housing cover, said cover being supported inwardly directly at a housing shoulder and abutting in the outward direction at an elastic retaining ring.

19. A servo-steering arrangement according to claim 18, characterized in that the control slide valve means is arranged at an end of the housing associated with an inner end of the steering shaft.

20. A servo-steering arrangement according to claim 1, characterized in that the structural length of the steering nut is approximately equal to its screw length.

21. A servo-steering arrangement according to claim 1, characterized in that the structural length of the steering nut is equal to its screw length.

22. A servo-steering arrangement according to claim 18, characterized in that the housing cover for the bore of the control slide valve means is constructed in the shape of a pot and the control slide valve means extends into the interior space of the pot.

23. A servo-steering arrangement according to claim 1, characterized in that a steering spindle portion rigidly connected with the steering worm projects out of the housing means on that housing end face which is adjacent the narrow guide piston portion provided in said housing means.

24. A servo-steering arrangement according to claim 23, characterized in that a concentric opening of the working piston for the insertion of the steering worm is closed in a pressure-tight manner at the end of the working piston opposite said steering spindle portion.

25. A servo-steering arrangement according to claim 1, characterized in that the aperture means has a substantially constant and essentially rectangular cross section.

26. A servo-steering arrangement according to claim 1, characterized in that the steering nut is provided with a control bar disposed substantially perpendicular to the axis of rotation of the steering nut for the actuation of the control slide valve means, said control bar being formed in one piece with the steering nut.

27. A servo-steering arrangement according to claim 1, characterized in that the control slide valve means is inserted directly into a housing bore of the housing means.

28. A servo-steering arrangement according to claim 9, characterized in that the steering shaft is provided with a single toothed segment means.

29. A servo-steering arrangement according to claim 28, characterized in that the center axis of the aperture means extends substantially parallel to the plane of the root of the teeth of the toothed rack profile means.

30. A servo-steering arrangement according to claim 1, characterized in that the steering nut is supported at one end with respect to the working piston exclusively by an axial bearing.

31. A servo-steering arrangement according to claim 30, characterized in that a bearing place of the member which supports said axial bearing of the steering nut is operable to travel over an inner end of a sealing bush means forming a radial inner seal of the working piston, said sealing bush means being fixedly inserted into the gear housing and surrounding a steering spindle rigidly connected to the steering worm.

32. A servo-steering arrangement according to claim 30, characterized in that a cage at the bearing associated with the axial bearing is provided, said cage having a radial inner part with axial engaging means for centering the cage at the steering nut.

33. A servo-steering arrangement according to claim 30, characterized in that the steering spindle is provided with a collar which is supported axially and radially with respect to the housing means by means of respective axial and radial roller bearings, and in that the associated radial roller bearing is arranged at the circumference of the collar.

34. A servo-steering arrangement according to claim 30, characterized in that the steering nut is supported at one bearing place exclusively by said axial bearing, and at another spaced bearing place the steering nut is supported both radially and axially non-displaceably with respect to the working piston.

35. A servo-steering arrangement according to claim 30, characterized in that the steering nut is supported axially non-displaceably in the working piston but is supported radially displaceably at two spaced bearing places, and in that the steering worm is supported at both ends radially non-displaceably in the housing means.

36. A servo-steering arrangement according to claim 30, characterized in that the steering nut is non-displaceably supported in the working piston at one of its bearing places by both a radial and an axial roller bearing.

37. A servo-steering arrangement according to claim 1, characterized in that a steering spindle rigidly connected to the steering worm is provided with a collar which is supported axially and radially with respect to the housing means by means of respective axial and radial roller bearings, and in that the associated radial roller bearing is arranged at the circumference of the collar.

38. A servo-steering arrangement according to claim 1, characterized in that the steering nut is supported at one bearing place exclusively by an axial bearing, and at another spaced bearing place the steering nut is supported both radially and axially non-displaceably with respect to the working piston.

39. A servo-steering arrangement according to claim 1, characterized in that the steering nut is supported axially non-displaceably in the working piston but is supported radially displaceably at two spaced bearing places, and in that the steering worm is supported at both ends radially non-displacably in the housing means.

40. A servo-steering arrangement according to claim 1, characterized in that the steering nut is non-displaceably supported in the working piston at one of its bearing places by both a radial and an axial roller bearing.

41. A servo-steering arrangement according to claim 1, wherein said diametric plane is congruent with a center plane of the steering nut, said center plane and said axis of rotation being substantially perpendicular to one another.

42. A servo-steering arrangement according to claim 1, wherein said diametric plane is spaced from a center plane of the steering nut, said center plane and said axis of rotation being substantially perpendicular to one another.

43. A servo-steering arrangement for vehicles comprising: housing means, a working piston displaceably supported within a working cylinder formed in said housing means, a steering shaft having toothed segment means in meshing engagement with toothed rack profile means provided on said working piston, a steering nut rotatably supported in said working piston in a position axially fixed with respect to said working piston, a steering worm axially non-displaceably supported within said housing means, said steering nut being helically movably connected with said steering worm, and control slide valve means for controlling fluid flow to working spaces adjacent the working piston, wherein the axes of the steering shaft and the control slide valve means are substantially perpendicular to one another, the axis of the steering shaft being disposed in a diametric plane extending substantially perpendicular to the axis of rotation of the steering nut.

44. An arrangement according to claim 43, wherein said toothed segment means of said steering shaft has a toothed width disposed approximately centric to an axial plane of the housing means, said axial plane extending substantially perpendicularly to the axis of the stering shaft, the longitudinal axis of the working piston being disposed in said axial plane, and wherein the working piston is provided with substantially radial aperture means within the area of its toothed rack profile means for the insertion of the steering nut, the center axis of the aperture means being substantially perpendicular to the longitudinal axis of the working piston.

45. An arrangement according to claim 43, wherein said diametric plane is associated with a substantially center stroke position of the working piston.

46. An arrangement according to claim 43, wherein said diametric plane is spaced from the center plane of the steering nut, said center plane and said axis of rotation being substantially perpendicular to one another.

47. An arrangement according to claim 45, wherein said diametric plane is spaced from the center plane of the steering nut, said center plane and said axis of rotation being substantially perpendicular to one another.

48. An arrangement according to claim 46, wherein one end of said steering worm has connecting means for connecting said steering worm to a steering wheel, and wherein said diametric plane is located closer to said connecting means than is said center plane.

49. An arrangement according to claim 47, wherein one end of said steering worm has connecting means for connecting said steering worm to a steering wheel, and wherein said diametric plane is located closer to said connecting means than is said center plane.

50. An arrangement according to claim 43, wherein the axis of said control slide valve means is disposed in said diametric plane.

51. An arrangement according to claim 1, wherein the axis of said control slide valve means is disposed in said diametric plane.

52. A servo-steering arrangement according to claim 1, wherein said diametric plane is associated with a substantially center stroke position of the working piston.

53. An arrangement according to claim 43, wherein the axis of said control slide valve means is disposed in a plane extending substantially perpendicularly to said axis of rotation.

54. A servo-steering arrangement according to claim 1, wherein the axis of said control slide valve means is disposed in a plane extending substantially perpendicularly to said axis of rotation.

55. A servo-steering arrangement for vehicles wherein a working piston, stepped in diameter to form a narrow guide piston section and a wide working piston section exhibiting the effective cross-section for the pressure medium, is displaceably supported in a correspondingly stepped gear box and wherein a steering shaft in driving connection with the working piston and a control slide valve cooperating with a steering nut are disposed in the zone of the narrow gear box section, and wherein the steering nut is mounted in the guide piston section to be rotationally movable and axially non-displaceable and is connected by a screw connection with a steering worm axially fixed in the gear box, characterized in that a steering spindle section connected to the steering worm for rotation therewith penetrates the front side of the narrow gear box section toward the outside, and in that a sealing closure is inserted in a face of the working piston section which faces away from said steering spindle section, which sealing closure seals, in a pressure-tight manner, the central bore of the working piston for the entrance of the steering worm with respect to the working pressure chamber disposed oppositely to the steering spindle section.

56. A servo-steering arrangement for vehicles comprising:
   housing means,
   a working cylinder formed in said housing means, said working cylinder being of stepped configuration with a narrow cylinder guide section and a wider cylinder working section, said narrow cylinder guide section being disposed closer to a first end of said housing means than to a second opposite end of said housing means and said wider cylinder working section being disposed between said narrow cylinder guide section and said second end of said housing means,
   a working piston displaceably supported within said working cylinder, said working piston being of stepped configuration with a narrow piston guide section guided within said narrow cylinder guide section and a wide working piston section disposed in said wider cylinder working section,
   a steering shaft having steering shaft interengaging means for interengagement with corresponding working piston interengaging means on said working piston to effect movement of said steering shaft in response to movement of said working piston, a steering worm supported within said housing means, a steering nut rotatably supported in said working piston, said steering nut being movably connected with said steering worm, means for controlling fluid flow to working spaces in said cylinder working section at respective opposite sides of said working piston section, and a steering spindle section connected to the steering worm for rotation therewith, said steering spindle section extending outwardly through said first end of said housing means for accommodating application of external steering guide forces to said steering spindle section.

57. An arrangement according to claim 56, wherein said steering shaft interengaging means and said working piston interengaging means are disposed in said housing means in the area of said narrow cylinder guide section.

58. An arrangement according to claim 56, wherein said working piston interengaging means are spaced from said working piston section in the direction toward said narrow cylinder guide section.

59. An arrangement according to claim 58, wherein said steering shaft interengaging means and said working piston interengaging means are disposed in said housing means in the area of said narrow cylinder guide section.

60. An arrangement according to claim 56, wherein said first end of said housing means includes an opening for accommodating insertion of said steering spindle section and said steering worm into said housing means during assembly of said arrangement.

61. An arrangement according to claim 56, wherein a detachable cover is provided at said second end of said housing means for accommodating insertion of said working piston into said housing means during assembly of said arrangement.

62. An arrangement according to claim 60, wherein a detachable cover is provided at said second end of said housing means for accommodating insertion of said working piston into said housing means during assembly of said arrangement.

63. An arrangement according to claim 56, wherein said steering nut is supported in said working piston in a position axially fixed with respect to said working piston, wherein said steering worm is axially non-displaceably supported within said housing means, and wherein said steering nut is helically movably connected with said steering worm.

64. An arrangement according to claim 62, wherein said steering nut is supported in said working piston in a position axially fixed with respect to said working piston, wherein said steering worm is axially non-displaceably supported within said housing means, and wherein said steering nut is helically movably connected with said steering worm.

65. An arrangement according to claim 56, wherein said working piston includes a radial aperture means for accommodating radial insertion of said steering nut into position in said working piston means during assembly of said arrangement.

66. An arrangement according to claim 65, wherein said radial aperture means extends completely through said working piston.

67. An arrangement according to claim 65, wherein said radial aperture means is arranged in the narrow piston guide section.

68. An arrangement according to claim 65, wherein said aperture means has a substantially constant and essentially rectangular cross-section.

69. An arrangement according to claim 67, wherein said radial aperture means extends completely through said working piston.

70. An arrangement according to claim 69, wherein said aperture means has a substantially constant and essentially rectangular cross-section.

71. An arrangement according to claim 56, wherein a sealing closure is inserted in the face of the working piston which faces said second end of said housing, said sealing closure including means for sealing, in a pressure-type manner, the central bore of the working piston for the entrance of the steering worm with respect to the working space at the side of said working piston facing said second end of said housing.

72. An arrangement according to claim 56, wherein said means for controlling fluid flow includes control valve means.

* * * * *